Patented June 17, 1947

2,422,372

UNITED STATES PATENT OFFICE 2,422,372

PREPARATION OF AN ALUMINA SUPPORTED MOLYBDENUM OXIDE CATALYST

Albert E. Smith and Otto A. Beeck, Berkeley, Calif., assignors to Shell Development Company, San Francisco, Calif., a corporation of Delaware No Drawing. Application July 27, 1942, Serial No. 452,552

11 Claims. (Cl. 252—250)

1

This invention relates to new and improved catalysts comprising molybdenum oxide, to their preparation, and to their use in effecting catalytic conversions.

An object of the invention is to provide an improved process for effecting various catalytic conversions and, in particular, conversions involving dehydrogenation. A further object of the invention is to provide new and improved catalysts comprising molybdenum oxide. A further more particular object of the invention is to provide new supported molybdenum oxide catalysts which are stable against loss of catalytic activity at relatively high temperatures, and are therefore particularly adapted and advantageous for use in effecting various reactions wherein molybdenum oxide catalysts may be used and wherein it is necessary or desired to periodically regenerate the catalyst by burning carbonaceous deposits therefrom.

As is known, a great many metals and compounds thereof are recognized to catalyze reactions involving the C—H bond. For many processes and, in particular, those involving dehydrogenation a larger number of these catalytic agents may therefore be employed. It is recognized by those familiar with the respective processes that these various agents are by no means equivalents and that furthermore the characteristics of the individual members depend largely upon the method of catalyst preparation and the presence or absence of other components in the catalyst. One of the best and most versatile of these various catalytic agents is molybdenum oxide. This material per se is, however, a relatively poor catalyst except for certain specific cases and, as such, finds relatively little application. All of the advantageous characteristics of molybdenum oxide are only brought out when this material is applied in combination with suitable less active materials which also usually act as supports, carriers or extenders and in this form it finds relatively wide and varied application.

One of the primary functions of supports or extenders in molybdenum oxide catalysts is to increase the available catalytic surface. In conversions executed with the aid of solid catalysts the reactions take place predominantly at the fluid-solid interface. This is indicated by the fact that at temperatures above a certain threshold temperature the reaction rate is more or less proportional to the available catalyst surface in the reaction zone. It is known that certain substances have, besides the usual exterior surface, a minute porous structure and have therefore a large inner surface. Substances having large inner surfaces are generally active, i. e., adsorptive, and it can be shown that the adsorption

2 ability of such solids is generally more or less proportional to the inner surface. When molybdenum oxide is deposited upon such materials, a large catalytic surface is provided and catalysts of superior activity are produced. As will be seen, however, in properly designed catalysts the substance with which the molybdenum oxide is combined, besides affording an increased catalytic surface, has other important functions.

A great number of substances having large available surfaces have been used or suggested as supports for molybdenum oxide. Of the numerous materials available, alumina, due to its marked superiority in certain respects, is a particularly excellent carrier. The superiority of alumina over other carrier materials is due largely to its superior stabilizing and promoting properties in combination with a large inner surface, moderately good thermal stability, and availability. Alumina, it is found, is especially effective in stabilizing the activity of catalytic promoters deposited thereon. According to A. Mittasch and E. Keunecke [Z. Elektrochem 38, 666 (1932)], the stabilizing effect of alumina is due primarily to the fact that the somewhat porous interlayers of alumina prevent the recrystallization or sintering of the active catalyst. It has recently been found that alumina carriers frequently act as true catalyst promoters for many catalytic agents, such in particular as the oxides of chromium and molybdenum. An excellent example of such promotion is, for instance, the promotion of chromium oxide by alumina. Chromium oxide deposited on active alumina is over twice as active as the same chromium oxide deposited upon silica gel, notwithstanding the fact that the inner surface of the silica gel is much larger than that of the active alumina.

Although alumina is recognized as the best carrier or extending material for molybdenum oxide, it is well known that all aluminas are not equivalent and that some are not suitable. The aluminas employed in such catalysts are invariably activated, i. e., adsorptive aluminas. Precipitated aluminas contain considerable amounts of combined water and have little or no available inner surface. By suitably heating the alumina to drive out a portion of the water, small pores are opened up in the interior, and it becomes adsorptive. It is then said to be activated. Alpha alumina, for example, which is the corundum form, contains little or no inner surface, cannot be activated, and is entirely unsuitable. Also, the alumina beta monohydrate, which has never been synthetically prepared but occurs in nature as the mineral diaspore, is likewise very inferior. The alumina beta monohydrate, diaspore, has little adsorptive capacity and, if heated to drive off part of its water, it is converted directly to inactive alpha alumina. Suitable activated aluminas, on the other hand, may be prepared from the gamma aluminas of the Haber system. Haber [Naturwiss 13, 1007 (1925)] classifies the various forms of alumina into two systems designated by him as the gamma and beta systems, according to their behavior upon heating. The gamma aluminas of the Haber classification comprise gamma alumina and all of the so-called hydrated aluminas which, upon heating, are converted to alpha alumina through the gamma form. The beta aluminas of the Haber system of classification comprise those aluminas such as diaspore which, upon heating, are converted directly to alpha alumina without going through the gamma form. The classification of aluminas into two systems, designated gamma and beta, according to Haber, is not to be confused with the fundamental true alumina forms. This classification is merely for the purpose of dividing the common forms of alumina into two distinct groups. Thus, the various so-called hydrated aluminas which are classified as belonging to the gamma system in the Haber classification are totally distinct from the true gamma alumina, and diaspore is not a beta alumina. The aluminas which, upon heating, are converted into alpha alumina through gamma alumina and belong to the gamma system of the Haber classification are:

The alumina alpha trihydrate, known as gibbsite or hydrargillite: This form is readily prepared synthetically and occurs in nature in the mineral gibbsite and as a component of certain bauxites;

The alumina beta trihydrate, known also as bayerite: It is isomorphous with hydrargillite. It does not occur naturally, but may be prepared synthetically by proper control of the precipitation conditions;

The alumina alpha monohydrate, known as böhmite: This alumina is formed by the partial dehydration of either of the above two trihydrates;

Gamma alumina: This is a meta-stable anhydrous oxide which does not occur naturally, but may be prepared by carefully controlled dehydration of any of the first three mentioned hydrates;

Gelatinous aluminum hydroxide: This frequently encountered alumina is amorphous when freshly precipitated, but after aging the characteristic lines of böhmite can be detected by X-ray analysis. On further aging, the precipitate is gradually transformed to bayerite and finally to hydrargillite;

Bauxite: This ore is of varied composition. The term "bauxite" was used in the older literature to designate the dihydrate. It is now known that bauxite consists of an extremely finely divided mixture of two or more of the known aluminas and certain argillaceous residues. No dihydrates of aluminas have ever been observed.

It is to be noted that the terms "alumina beta monohydrate," "alumina alpha monohydrate," etc., have no relation to the terms "beta alumina" and "alpha alumina." Thus, the alpha hydrate forms are not alpha alumina in any sense and the beta hydrate is not beta alumina. It is also to be noted that the various water-containing forms of alumina are referred to herein in the conventional manner as "hydrates," even though it is generally known that the water in these so-called hydrates does not exist in the form of hydrated water, but in the form of hydroxyl water.

It will be appreciated from the above considerations that the various activated, i. e., adsorptive, aluminas hitherto employed consist essentially of böhmite (alumina alpha monohydrate). More recently, it has been found that gamma alumina, which is prepared by complete dehydration, is superior to alumina alpha monohydrate in these catalysts when used for certain purposes. During use the alumina alpha monohydrate, if this is employed in preparing the catalyst, is often converted to gamma alumina. This transformation is, however, in no way detrimental.

In view of the ability of these molybdenum oxide-alumina catalysts to catalyze at least to a certain extent such reactions as the dehydrogenation of organic compounds, the dehydrocyclization of paraffin hydrocarbons to aromatic hydrocarbons, the dehydro-isomerization of such compounds as methyl cyclopentane, dimethyl cyclopentane, ethyl cyclopentane, etc. directly to aromatic hydrocarbons, the hydrogenation of various unsaturated organic compounds, the isomerization of isomerizable paraffin hydrocarbons, the desulfurization of sulfur-bearing hydrocarbon fractions, the destructive hydrogenation of high molecular weight carbonaceous materials, the oxidation of organic compounds, and the like, these versatile catalysts have been widely experimented with and for certain applications have come into wide use.

In spite of the general superiority of these molybdena-alumina catalysts they have certain defects which have limited the extent and scope of their use. Two major defects are their inability to withstand elevated temperatures and their relatively short active life. We have found that the relatively rapid decline in the catalytic activity of these catalysts is due primarily to the transformation of the alumina from the gamma 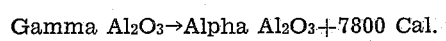 form to the alpha form:

$$\text{Gamma } Al_2O_3 \rightarrow \text{Alpha } Al_2O_3 + 7800 \text{ Cal.}$$

This transformation takes place at appreciable rates only at temperatures of the order of 900° C.–1000° C. or above. At lower temperatures such as are usually employed in catalytic processes this conversion is quite slow, but nevertheless takes place over extended periods of time. We have found that $MoO_3$ catalyzes this transformation, causing it to be consummated at appreciable rates even at relatively low temperatures.

We have concerned ourselves with the problem of overcoming the above-mentioned defects in these otherwise excellent catalysts and have found that this may be accomplished by converting the alumina prior to impregnating it with the molybdenum oxide into an active more stable form. According to one method which we have developed, the alumina is converted into an active thermally stable alkaline earth-beta alumina. (Throughout the present specification and in the appended claims the group of alkaline earth metals is considered to consist of Ca, Sr and Ba.) This method is described and claimed in our copending application Serial No. 452,656, filed July 28, 1942. In this method, although excellent stabilization is effected, it is necessary to subject the alumina during the preparation to relatively high temperatures for appreciable periods of time. This is not only inconvenient but causes a small to appreciable loss of the alumina surface due to the growth of the alumina crystallites. We have now developed a further improved method whereby excellent stabilization may be effected while employing a considerably less drastic heat treatment.

In preparing thermo-stable catalysts according to the method of said copending application Serial No. 452,656, it was observed that in the case of molybdena-alumina catalysts an excess of free alkaline earth metal oxide in the alumina carrier exerted an additional stabilizing effect in certain cases. Careful investigation of this phenomenon led to the discovery that the alkaline earth metal oxides when present in the carrier in the free state in certain concentrations readily react with a portion of the subsequently-deposited molybdenum oxide at relatively low temperatures to form a characteristic calcium molybdate which greatly increases the resistance of the catalyst against deterioration by heating at higher temperatures. The manner in which the alkaline earth molybdate stabilizes the alumina and prevents the transformation into the alpha modification is not definitely known. It appears that the stabilization is the result of several factors. As will be explained more fully below, it appears that by the method of preparation presently to be described an alkaline earth metal molybdate film is formed through the reaction of $MoO_3$ with a strongly adsorbed alkaline earth metal oxide film and serves to some extent as a protective coating preventing or greatly diminishing direct contact of the alumina with $MoO_3$. It also appears that the alkaline earth metal molybdate acts to lower the vapor pressure of $MoO_3$ in the catalyst.

According to the present invention, we execute catalytic reactions with novel molybdena-alumina catalysts stabilized against deterioration by heat by certain concentrations of alkaline earth metal molybdate. The catalysts of the invention are made by impregnating a suitably prepared alumina base with molybdenum oxide and preferably heating the mixture under certain prescribed conditions.

To prepare the alumina base we may start with any of the gamma aluminas of the above-described Haber system of classification. In such cases where the alumina is relatively non-adsorptive, such as in the case of alumina alpha trihydrate and alumina beta trihydrate, it is preferably first activated in the usual manner. Activated aluminas consisting essentially of alumina alpha monohydrate and/or gamma alumina, as will be pointed out, are particularly suitable since they may be more easily and thoroughly impregnated. The alumina is preferably substantially free of impurities, such in particular as the oxide of iron usually found in appreciable concentrations in natural aluminas. In view of their greater purity the synthetically produced aluminas are generally preferred.

The alumina, preferably in the activated form, is preferably treated to remove small amounts of soluble salts such, in particular, as the sodium salts found in the preferred aluminas prepared by precipitation from sodium aluminate solutions. This may be effected in some cases by simply subjecting the alumina to a thorough water washing. A much more effective method is, however, to wash the alumina with a dilute acid solution. Although such acids as phosphoric acid and sulfuric acid may be used, preferred acids are hydrochloric acid, nitric acid, acetic acid, and hydrofluoric acid. The treatment may be simply effected by placing the alumina in a suitable tower and allowing a dilute solution of the acid to slowly pass through the mass at ordinary temperatures. No appreciable solution of the alumina need take place. A still more effective method is to wash the alumina with a dilute (for example, 0.2N) solution of a decomposable acid salt such as the nitrate of zirconium or aluminum, preferably aluminum. In this method even traces of soluble impurities are quickly replaced by traces of the applied salt, which then upon subsequent drying and heating is converted to the corresponding non-detrimental oxide while the anion component is volatilized.

In most cases the alumina will be in the form of granules or fragments of suitable size for use in catalysis. In such cases where the alumina is finely divided it may, if desired, be pelleted prior to incorporating the catalytic promoters. While the catalysts are usually employed in the form of small fragments or pills of suitable size for fixed bed operation, they may also be applied in the form of a finely divided powder in one of the so-called "fluid catalyst" systems of operation.

The alumina, preferably in the form of a pure active alumina, is brought into intimate contact with a suitable compound of calcium, strontium and/or barium. Although these three alkaline earth metals are all suitable, calcium is somewhat superior to strontium and barium in certain respects. This alkaline earth is therefore generally preferred. The alkaline earth metal compound is brought into intimate contact with the alumina, preferably by impregnating the alumina in an activated form with a solution of the alkaline earth compound and then drying, whereby the alkaline earth compound is uniformly distributed over the available surface of the alumina. It is also possible to combine the alumina and alkaline earth metal compound in intimate admixture by precipitating the alumina in the presence of a suitable concentration of the alkaline earth compound. Other methods such as co-grinding or the like may also be employed but are generally not preferred.

It is preferred to have the alkaline earth metal present in the alumina in the form of the oxide. It is therefore generally preferred to employ compounds of the alkaline earth metals which may be easily converted to the oxides by heat. Very suitable compounds are, for example, the nitrates and the acetates. These compounds also have the advantage of being water-soluble and therefore easily applied in the form of aqueous solutions. The conversion of the alkaline earth compound to the corresponding oxide may be effected by heating the impregnated alumina at a temperature above about 500° C., preferably in air. This heat treatment may be simply carried out at a temperature and for a time just sufficient to convert the alkaline earth metal compound to the oxide. It is found, however, that catalysts having superior thermal stability and activity are produced if a suitable additional heat treatment is given at this point. Thus, if the heating is effected at a temperature of or near 500° C., the heat treatment is preferably considerably extended beyond that required to convert the alkaline earth metal compound to the corresponding oxide. At somewhat higher temperature, for instance 600° C.–900° C., the heat treatment is preferably continued for some time, for example 1–10 hours, after the conversion of the alkaline earth metal compound to the corresponding oxide is substantially completed. The treatment may also, if desired, be effected at even higher temperatures, for instance 900° C.–1200° C. At these temperatures, however, the alumina is gradually transformed into a beta alumina. If these temperatures are applied, the heating is therefore continued only for such a short time that no substantial formation of the beta alumina takes place. Except when employing temperatures above about 900° C., prolonging the heating for greatly extended periods appears to exert no detrimental effect. This is illustrated in the Example II below.

The molybdenum oxide is then combined with the alumina containing the alkaline earth metal oxide. Any of the conventional methods of combining the molybdenum oxide may be employed. The preferred method is to impregnate the alumina containing the alkaline earth oxide with a solution of a molybdenum compound convertible to the oxide by heating in air. Thus, for example, the alumina-alkaline earth oxide may be soaked in a solution of ammonium molybdate, dried, and then heated to convert the ammonium molybdate to molybdenum oxide. Other suitable methods are described in U. S. Patent No. 2,184,235.

The relative amounts of molybdenum oxide and alkaline earth metal molybdate in the finished catalyst depends upon the relative amounts of molybdenum oxide and alkaline earth metal oxide incorporated with the alumina and the ratio of these components is important. The alkaline earth metal molybdates are in themselves poor catalysts and therefore contribute little, if anything, to the activity of the catalyst. It is therefore essential that the catalyst contain free molybdenum oxide. This condition is assured by employing a mol ratio of molybdenum oxide to alkaline earth metal oxide greater than 1:1. As this ratio is increased at a constant concentration of alkaline earth metal oxide, the activity of the catalyst increases up to a certain point and then gradually declines as pure molybdenum oxide is aproached. The stability of the catalyst against deterioration by overheating, on the other hand, declines as the ratio of molybdenum oxide to alkaline earth metal molybdate becomes large, due presumably to an insufficient amount of the stabilizing alkaline earth metal molybdate. In the preferred catalysts the concentration of alkaline earth metal is between about 1% and 5%, and the concentration of molybdenum oxide is between about 4% and 15% at a mol ratio greater than 1:1, but below about 1:1.57. Three per cent calcium (4.2% CaO) is just about a sufficient amount to produce a mono-molecular film of CaO on the available surface of the preferred active aluminas. This preferred amount is stoichiometrically equivalent to 7.2% molybdenum.

When alumina prepared with the alkaline earth metal oxide is impregnated with the bolybdenum compound, it appears that a certain amount of the corresponding alkaline earth metal molybdate is formed. Due to the firm bond between the alkaline earth metal oxide and alumina, particularly if the preferred heat treatment has been applied, this alkaline earth metal molybdate is apparently intimately bound to the alumina surface. During the following heat treatment to convert the impregnated molybdenum compound to molybdenum oxide, additional formation of the alkaline earth metal molybdate takes place. If the heat treatment to convert the molybdenum compound is discontinued as soon as the molybdenum oxide is formed, it is usually found that the catalyst still contains, besides the alkaline earth metal molybdate, a certain amount of free alkaline earth metal oxide, despite the molecular excess of molybdenum oxide. The catalyst so prepared may be suitably used as such and will be found to have excellent stability against deterioration by overheating. The catalytic activity of such catalysts is, however, initially somewhat low and gradually increases as the catalyst is used. This is illustrated in Example III below.

Catalysts of equal stability against deterioration by overheating and much superior activity are produced, we have found, if the catalyst prepared as above described is subjected to an additional heat treatment, preferably in air, at a temperature between about 500° C. and 850° C. This treatment may be of comparatively short duration, for instance 1 hour, or, if desired, may be extended for several hours. The beneficial effect of this treatment is roughly proportional to the time of heating until a maximum catalytic activity is reached. Further heating, although of no advantage, has not been found to be detrimental. This heat treatment may be effected simultaneously with the conversion of the impregnated molybdenum compound to molybdenum oxide. The described heat treatment, it appears, results in a somewhat further reaction between the molybdenum oxide and traces of free alkaline earth metal oxide to form additional amounts of the alkaline earth metal molybdate and also a more perfect re-distribution of the molybdenum oxide over the available surface. The material improvement in the catalyst brought about by the described heat treatment is believed to be due to these changes. As will be seen from Example V below, the described heat treatment, if applied to conventional molybdena-alumina catalysts, greatly decreases the catalytic activity.

It is also found that the initial activity of the catalyst may usually be increased somewhat by subjecting it prior to use to a further short treatment with hydrogen, for instance by heating it in a stream of hydrogen at about 400° C.–600° C. for 1–5 hours.

The catalysts prepared as above described possess all of the desirable physical and catalytic properties of the best of the hitherto known molybdena-alumina catalysts. From the physical standpoint they have, when properly prepared, a large internal surface and good mechanical strength. From the standpoint of catalytic activity the present catalysts compare favorably with the best molybdena-alumina catalysts of the prior art. The catalysts of the invention are, however, vastly superior to the hitherto-known molybdena-alumina catalysts with respect to the important property of stability against deactivation by overheating. The striking superiority of the present catalysts in this respect is illustrated in the examples below.

The above-described catalysts may be advantageously employed in place of the conventional molybdena-alumina catalysts in any of the processes wherein such catalysts are used. They are particularly useful and advantageous in the execution of processes such as the catalytic dehydrogenation of dehydrogenatable organic compounds, the dehydrocyclization of paraffin hydrocarbons, the desulfurization of sulfur-bearing hydrocarbon fractions, the dehydro-isomerization of methyl cyclopentane, dimethyl cyclopentane, ethyl cyclopentane, etc. to aromatic hydrocarbons, the destructive hydrogenation of higher molecular weight carbonaceous materials, the oxidation of organic compounds, and the like, where relatively higher temperatures are either used in the reaction or are encountered in the process. Their use is particularly advantageous in such of these processes where the catalyst is periodically regenerated by burning off combustible deposits, since such regeneration invariably involves subjecting the catalyst for at least a short time to quite high temperatures and is one of the prime causes of the loss of catalytic activity of the less stable catalysts hitherto used.

One of the most advantageous applications of the present catalysts is in the so-called "hydroforming" of hydrocarbon materials. This process involves the treatment of normally liquid hydrocarbons with molybdenum oxide catalysts in the presence of substantial amounts of added hydrogen under the following approximate conditions:

| | |
|---|---|
| Temperature °C | 425–550 |
| Pressure atm | 3–100 |
| Liquid hourly space velocity | 0.2–2.0 |
| Mol ratio of hydrogen to hydrocarbon | 1:1 to 10:1 |

These various processes, when effected with the above-described thermo-stable catalysts, are considerably improved and made much more economical. Thus, when employing the present thermo-stable catalysts, the catalyst replacement costs as well as the losses of production caused by changing the catalyst are greatly diminished. Also, the catalyst regeneration may be effected in less time at higher temperatures, thus decreasing the amounts of diluent regeneration gases to be circulated and increasing the production capacity per converter by increasing the ratio of the onstream time to regeneration time. Furthermore, since the present catalysts may be safely subjected to much higher temperatures than the hitherto-employed catalysts, these various processes may be executed in catalytic converters of larger and simpler design, thus materially decreasing the cost of equipment.

The following examples which it is to be understood, are not intended to limit the invention in any way are submitted for the purpose of illustrating various points described above.

Example I

A standard type hydroforming catalyst I was prepared by impregnating pellets of pure activated gamma alumina with molybdenum oxide (8% Mo). The catalyst possessed a specific surface of 83 m.$^2$/gm. (All specific surfaces given herein were measured after the customary reduction of the catalyst with hydrogen at 490° C.). The catalyst so produced when tested under the following standardized test conditions for the treatment of methyl cyclohexane:

| | |
|---|---|
| Temperature °C | 490 |
| Pressure atms | 20 |
| Liquid hourly space velocity | 0.25 |
| Mol ratio of diluent to hydrocarbon | $^1$5.0 |
| Contact time sec | 100 |
| Process period hrs | 12 |

$^1$ 50% H$_2$ and 50% natural gas.

gave an average mol per cent of toluene in the liquid product of 87%.

Another standard type hydroforming catalyst II was prepared by impregnating pellets of activated gamma alumina with molybdenum oxide (7.4% Mo). On the standard test the average mol per cent toluene was 89%. After regeneration the average mol per cent toluene was 86%.

A standard commercial hydroforming catalyst III was prepared by impregnating Alorco Activated Alumina—grade A (consisting essentially of alumina alpha monohydrate) with molybdenum oxide (7.6% Mo). In the standard test the average mol per cent toluene was 85%.

These examples, submitted solely for comparison, illustrate the order of activity under standardized test conditions of the best of the hitherto-known and employed hydroforming catalysts.

Example II

A quantity of gamma alumina in the form of pellets was treated with a 3N solution of aluminum nitrate to remove sodium impurities as above described. After draining, drying and heating at 700° C. for 4 hours, the alumina was impregnated with a solution of calcium acetate. After draining and drying, the alumina was heated for 3 hours at 600° C. to convert the calcium acetate to the oxide. The alumina containing 1.8% CaO was heated at 800° C. for 118½ hours. No noticeable change in the alumina took place. The alumina so prepared was then impregnated with an ammonium molybdate solution. After draining and drying, the catalyst was heated at 500° C. for 1 hour in hydrogen. The finished catalyst contained 9.9% Mo and possessed a specific surface of 67 m.$^2$/gm. In the standard activity test the average mol per cent toluene in the product was 85%.

Example III

A quantity of gamma alumina in the form of pellets was treated with a dilute solution of aluminum nitrate as above described to remove sodium salts. After draining and drying, the small amount of adsorbed aluminum nitrate was decomposed by heating the alumina for 1–2 hours at 700° C.–750° C. The alumina was then soaked in a solution of calcium acetate. After draining and drying, the alumina was heated at about 700° C. for about 7 hours. The thus-prepared alumina base containing 4% CaO was then impregnated with a solution of ammonium molybdate. After draining and drying, the catalyst was heated at about 500° C. for about 1 hour in hydrogen. The finished catalyst contained 8.2% Mo. In the standard test the average mol per cent toluene in the liquid product was 65%. Following this test the catalyst was heated for 6 hours at 600° C. in air. Following this treatment the average mol per cent toluene in the standard test increased to 77%. The catalyst was then subjected to a second heat treatment at 600° C. for 6 hours in air. Following this second treatment the average mol per cent toluene in the liquid product increased to 82%. The marked increase in the catalytic activity effected by heating the catalyst at relatively high temperatures, explained above, is clearly evident in this example. This increase in activity from 65% to 85% toluene in the standard test could likewise have been effected by simply heating the catalyst at about 700° C.–800° C. for 4–10 hours.

Example IV

A quantity of the catalyst described in Example III was impregnated with a further quantity of molybdenum oxide to a molybdenum content of 10.8%. In the standard test with this catalyst the average mol per cent toluene in the liquid product was about 93%.

This example illustrates the fact pointed out above that as the ratio of free molybdenum oxide to alkaline earth metal molybdate is increased the activity of the catalyst increases somewhat. As will be seen from Example V, however, the stability of the catalyst against deterioration by overheating was somewhat less.

*Example V*

Samples of various catalysts, both of the conventional type and the thermo-stable type of the present invention, were subjected to severe heat treatments and then tested for catalytic efficiency in the above-dscribed standard test. The catalysts tested were as follows:

No. 1—The standard type catalyst described in Example I (catalyst II) which had been heated at 800° for 6 hours in air prior to the test.

No. 2—The standard type catalyst described in Example I (catalyst III) which had been heated at 800° C. for 6 hours prior to the test.

No. 3—A commercial hydroforming catalyst which was heated at 800° C. for 6 hours in air prior to the test. This catalyst contained 4.94% Mo and is said to be prepared with Alorco Activated Alumina. In the standard test the fresh catalyst gave 90 average mol per cent toluene in the liquid product.

No. 4—A standard type catalyst which was heated at 800° C. for 6 hours in air prior to the test. This catalyst was prepared by impregnating pellets of gamma alumina with molybdenum oxide (8% Mo). In a five-hour test period under the described standard test conditions the fresh catalyst gave 90 average mol per cent toluene in the liquid product.

No. 5—A standard type catalyst which was heated at 800° C. for 6 hours in air prior to the test. This catalyst was prepared by impregnating pellets of gamma alumina with molybdenum oxide (8% Mo). In the standard test the average mol per cent toluene in the liquid product with the fresh catalyst was 93%.

No. 6—The thermo-stable catalyst described in Example III (after the second treatment at 600° C.) after being further heated at 800° C. for 6 hours in air prior to the test.

No. 7—The same catalyst as No. 6 after being heated a second time for a further 6 hours at 800° C. in air prior to the test.

No. 8—The thermo-stable catalyst described in Example IV after being heated for 6 hours at 800° C. in air prior to the test The mol per cents of toluene in the liquid products after various numbers of hours of continuous treatment are shown in the following table:

| Time | Catalyst | | | | | | | |
|---|---|---|---|---|---|---|---|---|
| | 1 | 2 | 3 | 4 | 5 | 6 | 7 | 8 |
| 1 hr | 58 | 33 | 48 | 60 | 17 | | | 88 |
| 2 hrs | 44 | 25 | 44 | 53 | 10 | 84.2 | | 89 |
| 4 hrs | 30 | 21 | 40 | 48 | 8 | 86.4 | | 81 |
| 8 hrs | 19 | 17 | | | 7 | 82.8 | 85 | |
| 12 hrs | 16 | | | | 4 | 81.4 | | |

From inspection of the above table, it is seen that all of the standard type molybdena-alumina catalysts, such as are now being used, were severely damaged by heating at 800° C. It is also seen that the present thermo-stable catalysts, possessing substantially the same catalytic activity as the fresh standard type catalysts, show no deterioration upon being subjected to the severe heating applied. In fact, it appears that their catalytic activity improved slightly.

We claim as our invention:

1. The process for the preparation of an improved supported molybdenum oxide catalyst having enhanced stability against loss of activity upon heating at temperatures up to 800° C. which comprises impregnating a calcined adsorptive alumina with a compound of an alkaline earth metal convertible to the oxide by heat in an amount equivalent to between 1% and 5% of alkaline earth metal, calcining the thus impregnated alumina at a temperature of from about 600° C. to about 900° C. to form a surface layer of alkaline earth metal oxide, impregnating the thus formed composite with a compound of molybdenum convertible to the oxide by heat in an amount equivalent to between about 4% and about 15% of molybdenum and in mol excess with respect to said alkaline earth metal, again calcining the thus formed composite to convert the molybdenum compound to molybdenum oxide and cause reaction of the underlayer of alkaline earth metal oxide with a portion of the overlayer of molybdenum oxide.

2. Process according to claim 1 in which the first heat treatment is carried out at a temperature between 600° C. and 900° C. and is continued for 1 to 10 hours after the conversion of the alkaline earth metal compound to the corresponding oxide is substantially completed, said heat treatment being insufficiently severe to cause the formation of beta alumina, and the catalyst is given a final heat treatment at a temperature between about 500° C. and 850° C. for several hours.

3. Process according to claim 1 in which the adsorptive alumina is pretreated to remove sodium salts prior to the first impregnation.

4. The process for the preparation of an improved supported molybdenum oxide catalyst having enhanced stability against loss of activity upon heating at temperatures up to 800° C. which comprises impregnating a calcined adsorptive alumina with a compound of calcium convertible to the oxide by heat in an amount equivalent to between 1% and 5% of calcium, calcining the thus impregnated alumina at a temperature of from about 600° C. to about 900° C. to form a surface layer of calcium oxide, impregnating the thus formed composite with a compound of molybdenum convertible to the oxide by heat in an amount equivalent to between about 4% and about 15% of molybdenum and in mol excess with respect to said calcium, again calcining the thus formed composite to convert the molybdenum compound to molybdenum oxide and cause reaction of the underlayer of calcium oxide with a portion of the overlayer of molybdenum oxide.

5. The process for the preparation of an improved supported molybdenum oxide catalyst having enhanced stability against loss of activity upon heating at temperatures up to 800° C. which comprises impregnating a calcined adsorptive alumina with a compound of strontium convertible to the oxide by heat in an amount equivalent to between 1% and 5% of strontium, calcining the thus impregnated alumina at a temperature of from about 600° C. to about 900° C. to form a surface layer of strontium oxide, impregnating the thus formed composite with a compound of molybdenum convertible to the oxide by heat in an amount equivalent to between about 4% and about 15% of molybdenum and in mol excess with respect to said strontium, again calcining the thus formed composite to convert the molybdenum compound to molybdenum oxide and cause reaction of the underlayer of strontium oxide with a portion of the overlayer of molybdenum oxide, 6. The process for the preparation of an improved supported molybdenum oxide catalyst having enhanced stability against loss of activity upon heating at temperatures up to 800° C. which comprises impregnating a calcined adsorptive alumina with a compound of barium convertible to the oxide by heat in an amount equivalent to between 1% and 5% of barium, calcining the thus impregnated alumina at a temperature of from about 600° C. to about 900° C. to form a surface layer of barium oxide, impregnating the thus formed composite with a compound of molybdenum convertible to the oxide by heat in an amount equivalent to between about 4% and about 15% of molybdenum and in mol excess with respect to said barium, again calcining the thus formed composite to convert the molybdenum compound to molybdenum oxide and cause reaction of the underlayer of barium oxide with a portion of the overlayer of molybdenum oxide.

7. The process for the preparation of an improved supported molybdenum oxide catalyst having enhanced stability against loss of activity upon heating at temperatures up to 800° C. which comprises impregnating a calcined adsorptive alumina with a compound of an alkaline earth metal convertible to the oxide by heat in an amount equivalent to between 1% and 5% of alkaline earth metal, calcining the thus impregnated alumina at a temperature of from about 600° C. to about 900° C. to form a surface layer of alkaline earth metal oxide, impregnating the thus formed composite with a compound of molybdenum convertible to the oxide by heat in an amount equivalent to between about 4% and about 15% of molybdenum and in mol excess with respect to said alkaline earth metal, again calcining the thus formed composite to convert the molybdenum compound to molybdenum oxide and cause reaction of the underlayer of alkaline earth metal oxide with a portion of the overlayer of molybdenum oxide, and finally subjecting the thus formed catalyst to a heat treatment at a temperature between 500° C. and 850° C. for several hours.

8. The process for the preparation of an improved supported molybdenum oxide catalyst having enhanced stability against loss of activity upon heating at temperatures up to 800° C. which comprises coating the surface of a calcined adsorptive alumina with about 4.2% of calcium oxide by impregnation with a compound of calcium convertible to the oxide by heat, and heating the thus impregnated alumina at a temperature between about 600° C. and about 900° C., then depositing upon the thus formed surface of calcium oxide by a second impregnation a compound of molybdenum convertible to the oxide by heat in an amount equivalent to between about 7.3% and 11.2% of molybdenum, and finally heating the thus formed product to convert the molybdenum compound to the oxide and cause the underlayer of calcium oxide to react with a part of the overlayer of molybdenum oxide.

9. An improved supported molybdenum oxide catalyst having enhanced stability against deactivation upon heating at temperatures up to 800° C. prepared by impregnating a calcined adsorptive alumina with a compound of an alkaline earth metal convertible to the oxide by heat in an amount equivalent to between 1% and 5% of alkaline earth metal, calcining the thus impregnating alumina at a temperature of from about 600° C. to about 900° C. to form a surface layer of alkaline earth metal oxide, impregnating the thus formed composite with a compound of molybdenum convertible to the oxide by heat in an amount, equivalent to between about 4% and about 15% of molybdenum and in mol excess with respect to said alkaline earth metal, again calcining the thus formed composite to convert the molybdenum compound to molybdenum oxide and cause reaction of the underlayer of alkaline earth metal oxide with a portion of the overlayer of molybdenum oxide.

10. An improved supported molybdenum oxide catalyst having enhanced stability against deactivation by heating at temperatures up to 800° C. prepared by impregnating a calcined adsorptive alumina with a compound of calcium convertible to the oxide by heat in an amount equivalent to between 1% and 5% of calcium, calcining the thus impregnated alumina at a temperature of from about 600° C. to about 900° C. to form a surface layer of calcium oxide, impregnating the thus formed composite with a compound of molybdenum convertible to the oxide by heat in an amount equivalent to between about 4% and about 15% of molybdenum and in mol excess with respect to said calcium, again calcining the thus formed composite to convert the molybdenum compound to molybdenum oxide and cause reaction of the underlayer of calcium oxide with a portion of the overlayer of molybdenum oxide.

11. An improved supported molybdenum oxide catalyst having enhanced stability against deactivation upon heating at temperatures up to 800° C. prepared by coating the surface of a calcined adsorptive alumina with about 4.2% of calcium oxide by impregnation with a compound of calcium convertible to the oxide by heat, and heating the thus impregnated alumina at a temperature between about 600° C. and about 900° C., then depositing upon the thus formed surface of calcium oxide by a second impregnation a compound of molybdenum convertible to the oxide by heat in an amount equivalent to between about 7.3% and 11.2% of molybdenum, and finally heating the thus formed product to convert the molybdenum compound to the oxide and cause the underlayer of calcium oxide to react with a part of the overlayer of molybdenum oxide.

ALBERT E. SMITH.
OTTO A. BEECK.

REFERENCES CITED

The following references are of record in the file of this patent:

UNITED STATES PATENTS

| Number | Name | Date |
|---|---|---|
| 1,976,875 | Connolly et al. | Oct. 16, 1934 |
| 1,998,626 | Koenig | Apr. 23, 1935 |
| 2,102,160 | Nashan | Dec. 14, 1937 |
| 2,135,058 | Spicer et al. | Nov. 1, 1938 |
| 2,204,619 | Pier | June 18, 1940 |
| 2,209,458 | Heard et al. | July 30, 1940 |
| 2,209,908 | Weiss | July 30, 1940 |
| 2,229,353 | Thomas et al. | Jan. 21, 1941 |
| 2,172,534 | Grosse | Sept. 12, 1939 |
| 2,056,915 | Wulff | Oct. 6, 1936 |
| 2,231,446 | Grosse | Feb. 11, 1941 |
| 2,279,198 | Huppke | Apr. 7, 1942 |
| 2,279,703 | Bradley | Apr. 14, 1942 |
| 2,304,168 | Heard | Dec. 8, 1942 |
| 2,311,979 | Corson et al. | Feb. 23, 1943 |
| 2,322,863 | Marschner et al. | June 29, 1943 |

FOREIGN PATENTS

| Number | Country | Date |
|---|---|---|
| 410,771 | Great Britain | May 22, 1934 |